United States Patent
McVoy

[11] 3,936,747
[45] Feb. 3, 1976

[54] CODE OPERATED SWITCHING DEVICE FOR COMMUNICATIONS SYSTEMS AND THE LIKE

[75] Inventor: David S. McVoy, Sarasota, Fla.

[73] Assignee: Coaxial Scientific Corporation, Sarasota, Fla.

[22] Filed: July 5, 1973

[21] Appl. No.: 376,386

[52] U.S. Cl. .................. 325/30; 325/308; 325/55; 325/320; 178/DIG. 13
[51] Int. Cl.[2]... H04B 1/06; H02B 1/00; H04B 1/00; H04B 1/16
[58] Field of Search ........... 325/55, 58, 63, 30, 320, 325/308, 309, 163, 5; 178/DIG. 13, DIG. 15, 66 R, 50, 58; 179/2 AS, 15 BM, 84 SS

[56] References Cited
UNITED STATES PATENTS

| | | | |
|---|---|---|---|
| 3,020,398 | 2/1962 | Hyde...................... | 325/49 |
| 3,076,190 | 1/1963 | Shames et al.................. | 325/320 X |
| 3,320,535 | 5/1967 | Broadhead, Jr...................... | 325/49 |
| 3,571,710 | 3/1971 | West...................... | 325/30 |
| 3,786,424 | 1/1974 | McVoy et al...................... | 178/6 X |
| 3,794,928 | 2/1974 | Stump et al...................... | 325/30 X |
| 3,838,343 | 9/1974 | Yactor................................. | 325/58 |

OTHER PUBLICATIONS
IRE Dictionary of Electronics Terms and Symbols, The Institute of Radio Engineers, Inc., 1961.

*Primary Examiner*—Benedict V. Safourek
*Assistant Examiner*—Aristotelis M. Psitos
*Attorney, Agent, or Firm*—Olson, Trexler, Wolters, Bushnell & Fosse, Ltd.

[57] ABSTRACT

The embodiment of the invention disclosed herein is directed to a code operated switching device having a receiver for handling RF frequencies in a superheterodyne fashion without the need of local oscillators, or the like at the receiver. Input means is provided for receiving first and second RF frequencies having a predetermined frequency difference. The RF frequencies are FSK modulated simultaneously, one frequency increasing and the other decreasing, so that the frequency difference will produce a control signal at the output of an FM audio discriminator circuit. The control signal can be code modulated with series digital pulse information and applied to a code logic circuit that will detect if the proper code for the receiver has been received. If the proper code is received the logic circuit will energize an active control element such as a relay or the like to allow data to be transmitted back through the switching device.

16 Claims, 4 Drawing Figures

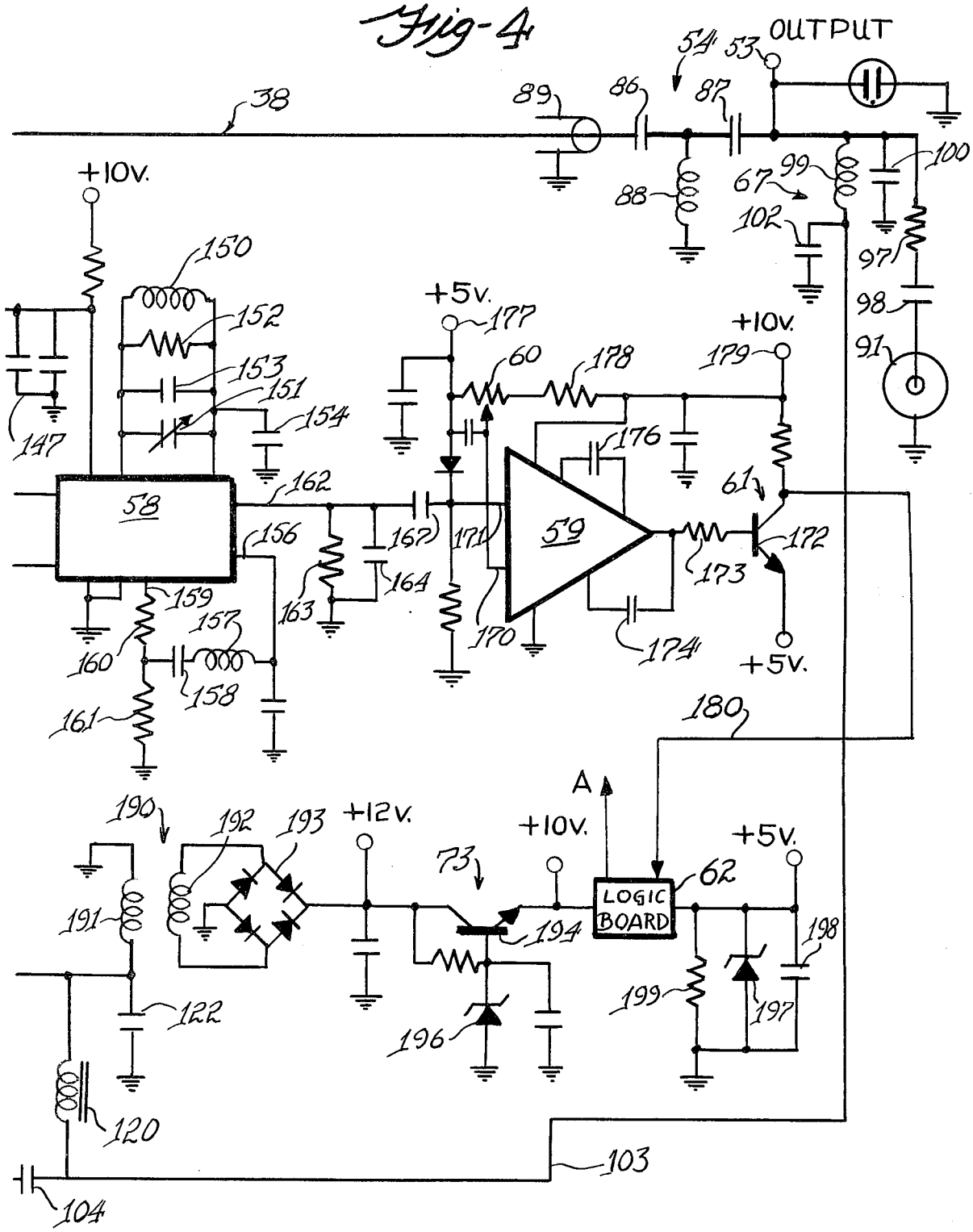

CODE OPERATED SWITCHING DEVICE FOR COMMUNICATIONS SYSTEMS AND THE LIKE

BACKGROUND OF THE INVENTION

This invention relates generally to radio receiver devices, and more particularly to radio receivers used as remote switching devices in communication systems such as cable television, and the like. Specifically, the present invention is directed to a code operated receiver which receives signal information in the form of a serial code and applies this information to a logic circuit which produces an output signal when the proper predetermined code for that logic circuit is received. The output signal from the logic circuit then actuates switching means to allow passage through the switching device of data information from a plurality of remotely located data transmitters back to a control station.

In communication systems, such as cable television, or the like, where data signal information is sent from a plurality of terminal points to a central data retriever it is often necessary to provide some means for identifying the particular terminal point so that the exact source of the data being received is known. To accomplish this the data transmission equipment at each terminal point may be costly, particularly if the number of terminal points is large. Therefore, it is desirable in large communication systems to reduce, as much as possible, the unit cost of each data transmitting device at each terminal point. A particular system arrangement for accomplishing this is disclosed in application Ser. No. 227,752, filed Feb. 22, 1972, now U.S. Pat. No. 3,786,424 and assigned to the same assignee of record. The disclosure within that application is incorporated herein by reference to the extent needed to understand the environment of the present invention.

CATV systems constitute one type of communications system that can be used for transmitting data over coaxial cables. These cable television systems often have a large number of subscribers constituting terminal points within the system where television receivers are located and are to be monitored. In the system disclosed in application Ser. No. 227,752 a plurality of television receivers make up a data transmitting group which may be identified by a particular code. A plurality of groups are provided in the system and each group has a different code. To allow access of the data transmitting devices at the television sets within each group a code operated switching device is utilized to be actuated in response to the code associated with that group to allow direct data transmission from the data transmitters located at the television sets back to the central station or head end. However, the system utilizes a plurality of code operated switches operated in response to RF frequency signals applied thereto. Each of the code operated switches includes an RF frequency receiver which functions in a superheterodyne fashion and therefore, require an oscillator to provide a frequency which is mixed with the incoming RF frequency to develope an intermediate frequency therefrom. The code signal information is then detected, as for example, by FM detector means, to produce code signal pulses. These code operated switching devices operate at relative high frequencies, in the order of 100 to 200 MHz. Therefore, the relative frequency stability of local oscillators is critical for proper operation. Due to environmental changes such as changes in ambient temperature the local oscillator must be of extremely high quality design and must use high quality components to insure stability of operation throughout the temperature ranges that it is subjected to. This substantially increases the cost of each of the coded switching devices within a coaxial cable television system, and thereby increases the cost of the overall system.

SUMMARY OF THE INVENTION

Accordingly, it is an object of this invention to provide a new and improved code operated swithcing device for recieving RF signals and which device eliminates the need for local oscillators therein.

Another object of this invention is to provide a new and improved code operated switching device for gaining access to a group of data transmitters within a cable television system.

Still another object of this invention is to provide a new and useful code operated switching device which is relatively inexpensive to manufacture thereby substantially reducing the cost of a system in which such devices are utilized.

Briefly, the present invention is directed to an apparatus which eliminates the need for having a local oscillator in an RF receiver device. This is done by transmitting two RF signals, one or both of which can be modulated with control signal information. In the embodiment disclosed herein both signals are modulated with FSK modulation. Ideally the spacing of the two carriers in the illustrated embodiments is equal to the intermediate frequency of the receiver, e.g., in the order of about 50KHz. However, other frequencies such as 455 KHz or 10.5 MHz may be used.

In the FSK modulation arrangement used herein carriers are shifted in opposite directions to produce a maximum difference between the two carriers. There are two advantages of this circuit arrangement. One is that it eliminates the need of an expensive oscillator circuit within the receiver when using FSK type modulation, which is important when using such receivers over a wide temperature range. The second advantage is that it saves cost in building the receivers in that the local oscillator is no longer needed.

Many other objects, features, and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIGS. 3 and 4, when placed side by side, illustrate the detailed schematic arrangement of the code operated receiver switch of this invention.

DETAILED DESCRIPTION OF THE ILLUSTRATED EMBODIMENT

Figure 1:
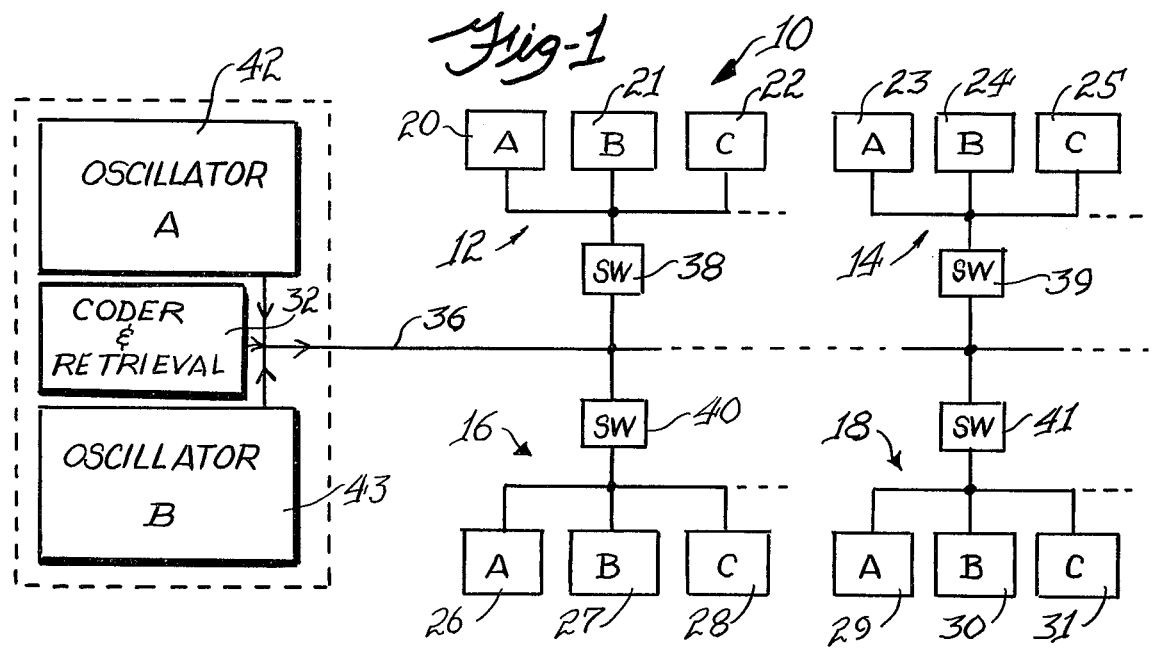
FIG. 1 is a simplified block diagram of a cable television system wherein the code operated receiver switch devices of this invention are utilized.

Referring now to FIG. 1 there is seen a communications system constructed in accordance with the principles of this invention and designated generally by reference numeral 10. The communications system 10 preferably is of a coaxial cable type, it being understood that other types of transmission systems or means may be used, for example, telephone lines or microwave transmission between line-of-sight powers, and the like. Also it will be understood that multi-cable coaxial systems can incorporate the novel aspects of this invention.

The communications system 10 includes a plurality of transmitting groups 12, 14, 16, and 18, etc., each transmitting group including a plurality of separate data transmitting devices associated with each of the subscribers in that group. The data transmitting devices may take the form as that substantially disclosed in application Ser. No. 227,752, filed Feb. 22, 1972 and assigned to the same assignee of record. These data transmitting devices are primarily of the type which convert the data of decimal number information into binary coded information to be transmitted serially over coaxial cables of the type used in CATV systems. In the contemplated use of the system 10, each discrete data transmitting means may represent a single user or subscribers home, which may be referred to as a terminal point, and the data which is transmitted is derived from a television converter device or other input means such as a burgular alarm, fire alarm, or the like, it being understood that such data transmitting devices can be used to transmit data corresponding to a multitude of homes if desired.

To maximize the number of individual homes from which data can be received, the system can be divided into discrete zones or areas corresponding to the groups 12, 14, 16, and 18 and each home in the area is designated with a particular code, it being assigned a known frequency in the illustrated embodiment, so that all data received on that frequency will be known to have come from that particular data transmitting device. For example, group 12 may consist of a plurality of homes 20, 21, 22, etc., while group 14 consists of a plurality of homes 23, 24, 25, etc. In similar fashion, group 16 includes a plurality of homes 26, 27, 28, etc., while group 18 consists of a plurality of homes 29, 30, and 31, etc. Since the groups of homes are distinct from one another there can be similar frequencies assigned to homes of different groups. For example, homes 20, 23, 26, and 29 may be assigned a given frequency and thus designated by reference letter A. The other corresponding homes having the same frequencies are thus designated by reference letters B, and C. Each of the data transmitting units associated with the respective homes are designed for continuous operation and need not receive interrogation signals to be turned on to transmit data. While a plurality of homes are illustrated with each group it will be understood that a single home or transmitting unit may correspond to a group as disclosed herein.

To receive the data from each of the groups, there is provided a coder and retrieval unit designated generally by reference numeral 32 and which includes circuit means to generate a predetermined code corresponding to a predetermined code of one of a plurality of code operated switching devices associated with each of the plurality of groups of transmitting devices. For example, a code operated switch device 38 is placed in communicative connection between the coder and retrieval circuit 32 and the group 12, while a second code operated switch device 39 is placed in communicative connection between the coder and retrieval unit 32 and the group 14. Similarly, a code operated switch device 40 is placed in communicative connection between the group 16 and the coder and retrieval unit 32 while a fourth code operated switch device 41 is placed in communicative connection between the group 18 and the coder and retrieval unit 32. The code information will activate the selected one of the plurality of code operated switch devices 38, 39, 40, or 41 and simultaneously deactivate any other previously activated code operated switching device so that only signal information from a single group is received at a given time. Therefore, since all of the data transmitting units 20–31 are continuously transmitting data, only the units which are associated with a particular group which will transmit signal information into the retrieval unit 32. Once the desired code operated switch is activated, all of the data transmitting units simultaneously supply data to the cable 36 and into a plurality of tuned circuits associated with the retrieval unit 32. The frequency of the data information received is preselected to identify the particular home from which the signals originated.

In accordance with the novel aspects of this invention a pair of RF frequency oscillators 42 and 43 are associated with the coder and retrieval unit 32 and provide the carrier waves which are modulated in response to the coded signal information necessary to actuate the switching devices 38, 39, 40, and 41. The RF oscillators 42 and 43 preferably are FSK modulated, and these oscillators are modulated substantially simultaneously in opposite directions from one another, i.e., one oscillator increasing in frequency while the other oscillator is decreasing in frequency. For example, oscillator A may operate at a frequency of 113.4 mc while the oscillator B may be operated at 113.45 mc. The difference frequency between these two oscillators provides an intermediate frequency of 50 kc which corresponds substantially to the IF frequency of the radio receiver portion of the code operated switching devices 38, 39, 40, and 41. It will be understood however, that other intermediate frequencies may be utilized, particularly frequencies corresponding to the sum of the oscillators A and B as well as frequencies corresponding to the difference of these oscillators. By so providing a pair of master RF oscillators at the head end or central station the need of local oscillators at each of the radio receiver portions of the code operated switches is thereby completely eliminated.

Figure 2:
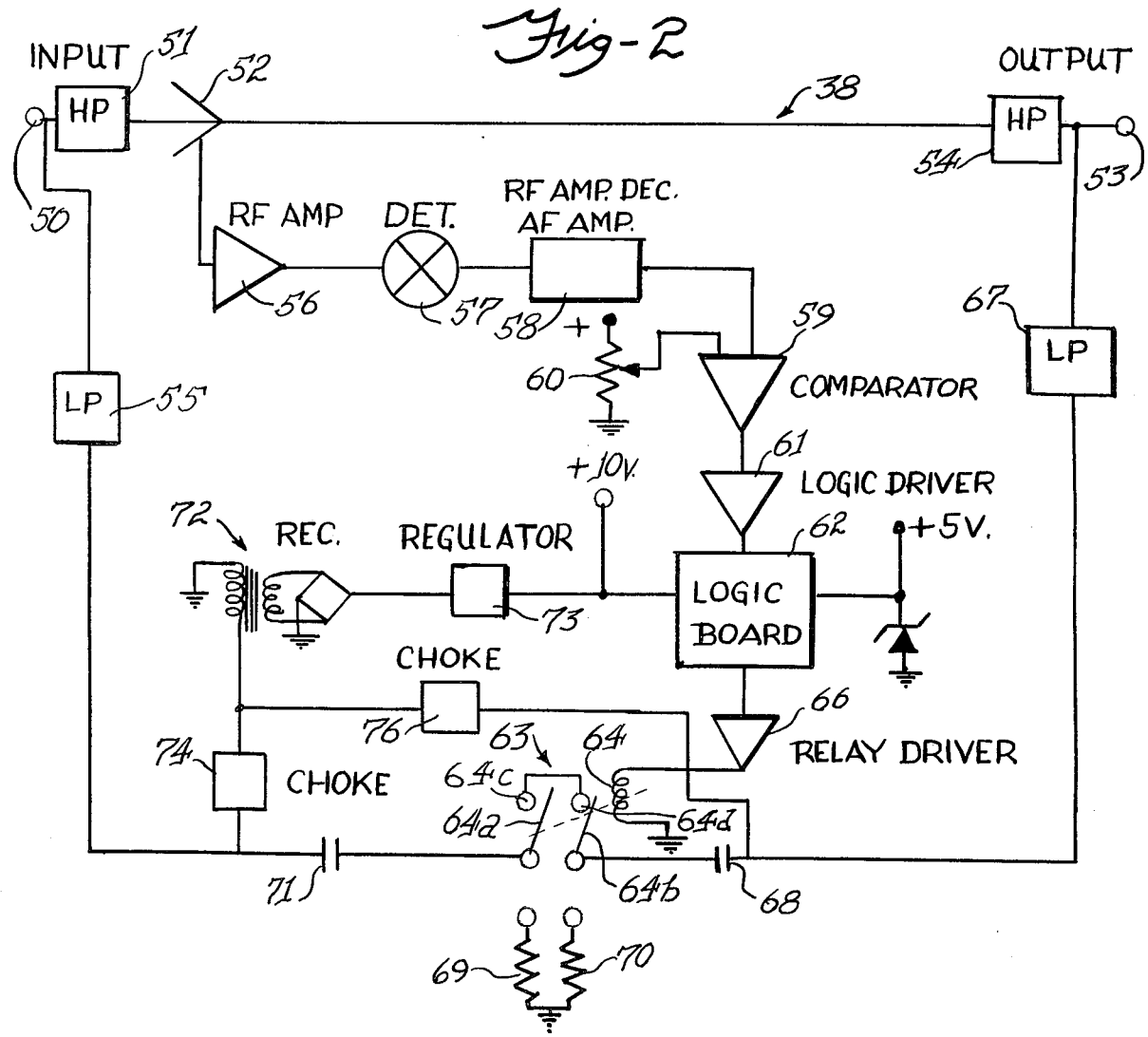
FIG. 2 is a simplified block diagram of a code operated receiver switch constructed in accordance with the principles of this invention.

Referring now to FIG. 2 there is seen a block diagram of the code operated switch 38. This switching device is a remote control radio receiver which will operate in response to coded signal information delivered thereto along RF frequency transmission lines 36. While only the code operated switch 38 is shown herein in detail, it will be understood that the code operated switches 39, 40, and 41 are substantially of similar construction and operation, it being understood that the only primary difference is in the logic board associated with the code assigned to the switches. The logic board arrangement therefore identifies the switch with a particular code to gain access to each of the associated ones of transmitting groups.

The code operated switch 38 includes an input terminal 50 coupled to a highpass filter circuit 51 and a lowpass filter circuit 55. The output of the highpass filter circuit 51 is directed to a directional tap element 52 to apply this signal to an output terminal 53 through a second highpass filter circuit 54. During normal operation return signals from each of the data transmitting devices within a particular group will not pass from output terminal 53 to input terminal 50 as a result of the blocking characteristics of the high pass filters 51 and 54. Therefore, signal information only passes in one direction through the tap element 52. The RF frequencies from oscillators A and B are then delivered to the input of an RF amplifier 56 which boosts the signal strength thereof and applies these signals to a detector stage 57. The mixer stage is provided with a tuned circuit at the output thereof for extracting the difference frequency of the frequencies produced by oscillators A and B. This difference frequency is an IF frequency delivered to an IF amplifier, detector and AF amplifier stage 58. This stage preferably being formed of an integrated circuit component having a multiplicity of active electronic elements associated therewith.

The output of the stage 58 is an audio signal in the order of about 4 kc, which is applied to one of the input terminals of a comparitor circuit 59. The comparitor circuit can take any suitable form and will function as a threshold or level setting device. For example, the second input of the comparitor circuit includes a variable voltage element or potentiometer 60 so that a threshold level can be set on the comparitor circuit, which is here illustrated as an operational amplifier; to allow passage of only those control signals which exceed a predetermined minimum value. This therefore, eliminates the possibility of extraneous pulse signals or other signals from effecting the code sensitive circuitry of the receiver.

The output of the comparitor 59 is applied to a logic driver stage 61 which, in turn, is coupled to a logic board 62. The logic board 62 can be formed of any suitable logic coding circuit, which may be, for example, a series to parallel converter type so that a given code signal in serial form will energize a switching device 63.

In the illustrated embodiment the switching deivce 63 takes the form of a relay having a relay coil 64 and a pair of movable contacts 64a and 64b. Relay 63 is shown in the energized condition in FIG. 2. The holding coil 64 of the relay is energized by a relay driving stage 66. When the contacts 64a and 64b are positioned, as shown in FIG. 2, the relay is deenergized and signal information from the plurality of data transmitters of the group 12 will be delivered through the code operated switch 38.

Upon receiving two RF frequencies which are FSK modulated to produce a control signal in accordance with a predetermined code set into the circuitry of the logic board, the logic board 62 will then provide an output signal to energize the relay 64 through the relay driver 66. This transfers contact 64a and 64b to engage the upper set of terminals 64c and 64d thereby connecting these terminals together. The signal information from the data transmitters 20, 21, and 22 are then delivered through the input terminal 53 a lowpass filter circuit 67, a series connected capacitor 68, contacts 64d and 64c, capacitor 71, low pass filter 55 back to the input terminal 50. Therefore, the signal information from the data transmitters travels in a direction opposite that of the direction from which the code signal information is received.

The logic board 62 of code operated switching circuit 38 has a logic circuit arrangement which identifies that particular switching device, and correspondingly identifies the particular group of data transmitters to which it allows access to. Other switching devices 39, 40, and 41 have logic boards which have different logic circuit arrangements so that access to these switches is obtained only when their particular code signal information is received. Also, it will be understood that access to any one of the code operated switches causes automatic deactuation of any other previously actuated code operated switch.

A rectifier and transformer stage 72 are provided to supply power to the logic board 62 through a regulator stage 73. To eliminate alternating current signals from the data signal transmission, a pair of choke networks 74 and 76 are provided as filters.

In operation, the head end or central station has code signal information FSK modulated upon the carrier waves produced by the oscillators 42 and 43. This is serial signal information delivered along the transmission line 36. This serial code signal information is delivered to all of the code operated switches 38, 39, 40, and 41 simultaneously. The FSK modulation is received and amplified by the RF amplifier and the IF signal is extracted after passing through the mixer 57. The IF signal provides high selectivity of a particular frequency within the frequency spectrum being used. When the code operated switch 38 is in an off condition, i.e. contacts 64a and 64b engaging the lower terminals, a relatively high impedance or return signal path from output terminal 53 to input terminal 50 exists by means of impedances 69 and 70. This then substantially completely blocks all signals developed at the data transmitting devices at homes 20, 21, and 22. Upon receiving the proper interrogation code at the logic board 62 the relay 63 is then actuated so that contacts 64a and 64b move to their positions as shown in FIG. 2 to engage contact 64c and 64d. While resistance elements 69 and 70 are shown any suitable impedance device can be used. This then substantially reduces the return impedance path from output terminal 53 to input terminal 50 and allows the signal information at the data transmitters to flow through the now closed circuit path of the code operated switching device back to the central station.

Figure 3:
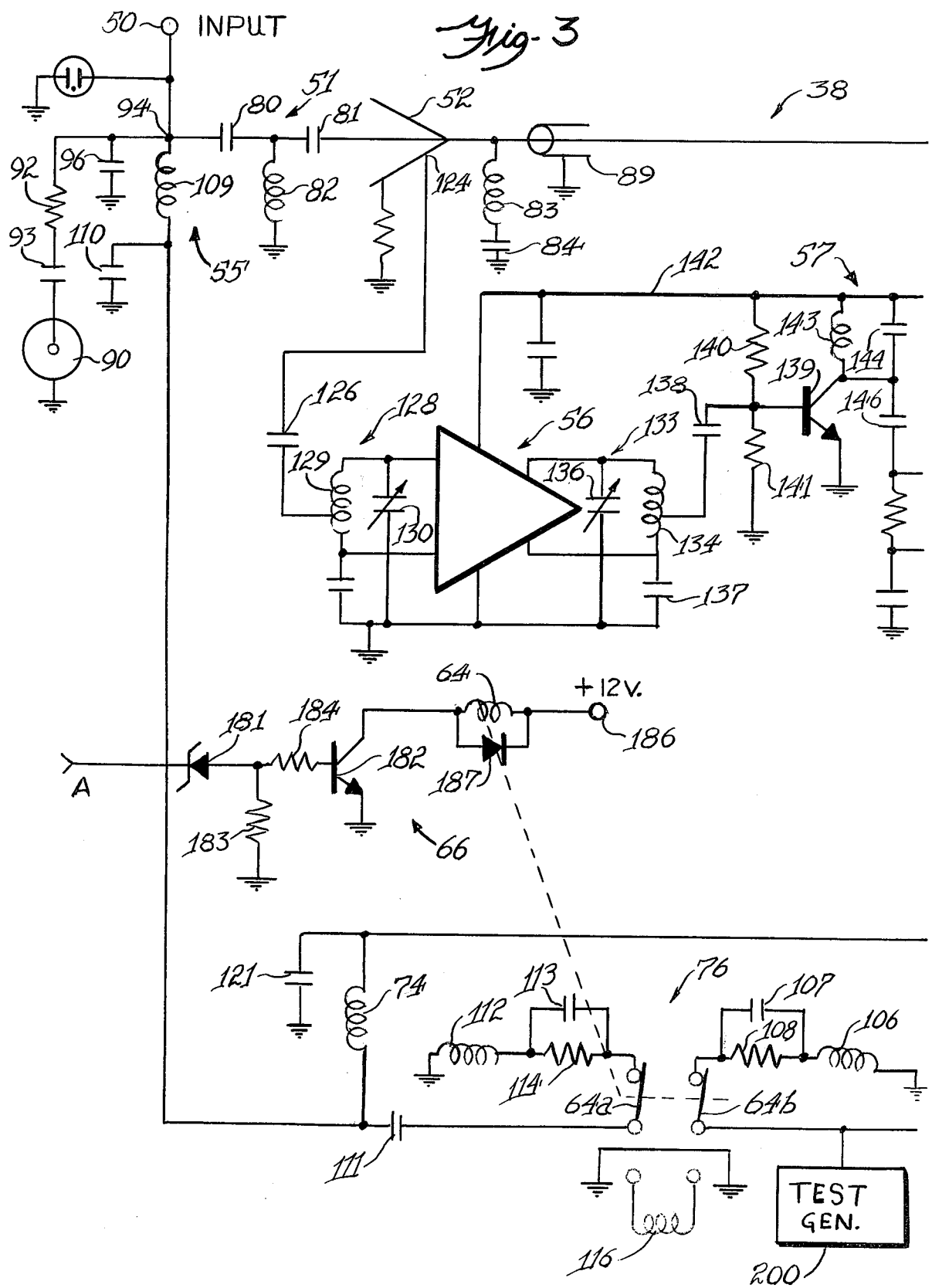

For a better understanding of the particular details of the code operated switch 38 reference is now made to FIGS. 3 and 4, placed side by side to one another (FIG. 4. to the right of FIG. 3.), which illustrates one particular component arrangement to provide the novel switching receiver arrangement in accordance with the principles of this invention. The particular circuit arrangement illustrated in FIGS. 3 and 4 represents a code operated siwtch 38 and is here intended to be a device which receives a digital command signal at 113.4 mc, detects that signal, decodes it, and controls a relay which disables a 5 to 30 mc portion of a CATV spectrum in a cable television system. The digital command signal consists of two RF carriers, one at 113.4 mc and the other at 113.45 mc. These carriers are frequency key shifted (FSK modulated) so that the difference between them is in the order of about 50 kc for a logic zero state and 54 kc for a logic one state.

In a cable television system of the type contemplated herein a VHF carrier wave, having a frequency of between 50 and 270 mc, is applied to the input terminal 50. This carrier wave is generated and controlled at the head end or central station of the system where the oscillators 42 and 43 and coder and retrieval units are located. The term carrier wave in the present invention is intended to include two frequencies. The carrier wave is routed from the input terminal 50 through the highpass filter network 51 into the 10db directional tap 52. In the illustrated embodiment the highpass filter 51 comprises a pair of series connected capacitors 80 and 81, which are in the order of about 30 and 39 picofarads, respectively. The high pass filter network 51 further includes an inductance element 82 having one end thereof connected to a circuit point intermediate of the capacitors 80 and 81 and the other end thereof connected to chassis ground or to earth ground potential. One of the output terminals of the 10db directional tap 52 is coupled to an inductance element 83 which, in turn is connected in series with a capacitor 84 to ground potential and this series inductance capacitance network forms part of the highpass filter network 51.

The input terminal 50 is coupled to the output terminal 53 through the highpass filter network 51 and the series connected highpass filter network 54 which comprises a pair of series connected capacitors 86 and 87. Capacitor 86 is in the order of about 39 picofarads while capacitor 87 is in the order of about 30 picofarads. An inductance element 88 has one end thereof connected to a circuit point intermediate the capacitors 86 and 87 and the other end thereof connected to ground potential. The highpass filter network 54 also includes whatever inductance and capacitance components are measurably significant in a coaxial or shielded cable 89 connected between the output of the 10db directional trap 52 and the input of the highpass filter 54. The two highpass filter networks 51 and 54 have a cutoff frequency of approximately 50 mc to eliminate signal interference from frequency spectrums outside of the cable television system. The insertion loss of VHF pass band is approximately 1.5 db. Connected to both the input terminal 50 and the output terminal 53 are gas discharge devices to provide surge protection to the entire circuit. These gas discharge devices are conventional.

Also connected to both the input and output terminals are test points 90 and 91, respectively, which are arranged to provide a 20 db reduction in signal so as to enable a technician to observe circuit operation with test equipment such as oscilloscopes and the like. The test terminal 90 includes a series connected resistor 92 and capacitor 93 connected to the terminal 50 at a circuit point 94. A filter capacitor 96 is connected between the terminal 94 and ground potential. Test terminal 91 includes a series connected resistor 97 and capacitor 98 connected to a circuit point 99 which is associated with the output terminal 53. A capacitor 100 is connected to the circuit point 99 to provide filtering in the same manner as capacitor 96.

The portion of the spectrum below the band pass, i.e., that portion between 5 and 30 mc, is picked up at output terminal 53 and routed through a lowpass filter network 67 comprising an inductance element 99 and a capacitor 102 through a line 103 and through a bypass capacitor 104. The value of the bypass capacitor 104 is in the order of 0.01 micorfarads while the value of capacitor 102 is in the order of 120 picofarads. The lowpass filter path continues through to ground potential through the left hand movable contact 64b and a series inductance element 106, capacitor 107 and resistor 108. At input terminal 50 there is also provided the lowpass filter network 55 which comprises a series connected inductance element 109, capacitor 110, bypass capacitor 111, through the second movable contact 64a through a series connected inductance element 112 and capacitor 113 parallel by a resistor 114. This then effectively connects the lowpass filter networks to ground potential when the relay holding coil 64 is in a deenergized state, with the contacts 64a and 64b substantially as shown in the drawings. When relay 64 is energized, or in the on position, an additional inductance element 116 is connected in series with the lowpass filter path so that a lowpass coupling connection is made between input terminal 50 and output terminal 53. This may be used to allow return of signal information from the plurality of data transmitting units at each of the houses within a particular group to pass through the radio controlled and code operated switching device 38 back to the head end or central station.

The lowpass filter arrangement as described above provides approximately a 1 db insertion loss over the subband, i.e., between 5 and 30 mc. When the holding coil 64 is in the deenerigzed position both the input and output lowpass filter sections are terminated to ground potential through the components illustrated above. During the off condition of the relay, however, there is approximately a 40 db insertion loss between the input and output terminals. The choke element 74 is paralled by a second choke device 120 and serves to divert 60 volt AC line power around relay 64. A pair of capacitors 121 and 122 are used for RF bypass filtering.

The RF amplifier stage 56 is designed to operate in the VHF spectrum which is taken off of the tap port 124 of the 10 db directional tap 52. This provides a signal 10 db below the level of the signal which is delivered to the input terminal 50 of the code operated switching device. This signal is then fed through a coupling capacitor 126, which is in the order of about 150 picofarads, to the input tap 127 of a resonant tank circuit 128. The tank circuit 128 includes a tapped inductance element 129, a variable capacitance element 130, and a feedback, or return path capacitor 131.

The tuned circuit 128 is tuned to a frequency of 113.4 mc and has a band pass characteristic which allows passage of both of the signals delivered from the oscillators 42 and 43, FIG. 1: that is the tuned circuit allows passage of frequencies of 113.4 and 113.45 MHz. These frequencies are delivered to an operational amplifier circuit formed as an integrated circuit 132 which has a gain factor of approximately 25 db. The amplified signal through the operational amplifier 132 is applied to a tuned circuit 133 comprising a tap inductance element 134, a variable capacitor 136, and a feedback capacitor 137. The tuned circuit 133 is tuned also to the input frequency of 113.4 MHz, and also has a band pass characteristic to allow passage of both the 113.4 MHz and 113.45 MHz signals. The output of the RF amplifier stage 56 is delivered through a capacitor 138, which has a value of approximately 100 picofarad to the base electrode of a transistor 139 which forms the active element of the detector 57. A voltage divider network comprising series connected resistors 140 and 141 provide bias potential to the base electrode of transistor 139 so that transistor operates as a class A amplifier from power received over a power line 142. The power line 142 can be connected to any suitable regulated source of voltage of for example, a ten volt source. The detector stage 57 also includes an inductance element 143 and parallel capacitor 144 which function as a tuned circuit which is tuned to the intermediate frequency, here it being the difference frequency of the two transmitting oscillators 42 and 43.

This tuned circuit is therefore tuned to approximately 50 kc and has a coupling capacitor 146 connected thereto for delivering this intermediate frequency to one input terminal 147 of the IF amplifier, detector, and audio frequency amplifier circuit 58. This network 58 can be formed by any suitable integrated circuit package available.

One of such integrated circuits is available from RCA under part number CA3075.

The two signals which are produced by the 50 kc difference in the detector stage are the frequency key shifted signals which are devloped by changing the frequency of the carrier wave in opposite directions. For example, the 113.4 mc signal is frequency key shifted to a lower frequency of approximately 2 kc to produce a logic one state control signal. On the other hand, the 113.45 mc signal is frequency key shifted upwardly approximately 2 kc to produce the logic one state. Therefore, the frequency key shifted modulation signals that produce the control signal appear at the output of the integrated circuit 58 are approximately 54 kc for a logic one state and approximately 50 kc for a logic zero state.

An inductance element 150 and variable capacitor 151 form a resonant discriminator circuit tuned to approximately 52 kc. A resistor 152 may be used for deQing the circuit to a desired band width while a capacitor 153 is used to set a minimum range of adjustment for the capacitor 151. The value of inductance element 150 is in the order of 22 millihendres while resistor is in the order of about 39 K ohms. The value of capacitor 153 is in the order of about 100 picofarads while the range of capacitance of adjustable capacitor 151 is between approximately 90 to 450. A high frequency bypass capacitor 154 is connected to the audio discriminator circuit and ground potential for filtering purposes.

The output at output terminal 156 is delivered through a series connected inductance element 157 and capacitor 158 to the input portion of an audio amplifier at terminal 159, this preferably being done through a current limiting resistor 160. The junctures between resistor 160 and capacitor 158 is provided with a signal developing resistor 161 which has one end thereof connected to ground potential. This audio signal is then amplified within the integrated circuit 58 and applied to an output terminal 162 which produces approximately 1.6 volts peak-to-peak of audio signal information from an originally detected 0.1 volt signal at terminal 156. An RC network comprising resistor 163 and capacitor 164 is provided to remove extraneous high frequency components from the audio control signal while a diode 166 receives signals through a capacitor 167 to establish a reference zero logic state of substantially zero volts at the input terminal of the comparitor stage 59.

The comparitor stage 59 comprises an integrated circuit arranged from an operational amplifier having two input terminals. An adjustable terminal 170 is coupled to the level set potentiometer 60 which applies approximately 0.8 volts above a logic zero state which appears at the second input 171 of the comparitor. The output of the comparitor is then fed to a driver transistor 172 which functions as the active component of the driver logic stage 61. The control signal is delivered through a current limiting resistor 173, and a portion of which is fed back through a feedback capacitor 174. Stabilizing capacitor 176 is provided for improved operational characteristics while power supplied to the comparitor through a 5 volt terminal 177 through the resistance element of the potentiometer 160 and a fixed resistor 178. Operating bias to driver transistor 172 is provided through a 10 volt terminal 179. The signal from transistor 172 is coupled over a line 180 to an input terminal of the logic board 62. The logic board comprises decoding circuitry to establish that this particular code operated switch has been actuated by the proper code address signal. An output line from the logic board 62, labelled A, is delivered to an input terminal, labelled A, on FIG. 3, which passes through a series connected limiting device, here illustrated as a Zener diode 181 to the base electrode of a transistor 182 which forms the relay driver circuit 66. The transistor 182 is biased to a conductive state only when a signal exceeds the Zener level of the diode 181, and this signal is then developed across a signal developing resistor 183 and applied to the base electrode of transistor 182 through a series connected resistor 184. A 12 volt source is applied between terminal 186 thereby being available at one end of the relay holding coil 64. The other end of the relay holding coil 64 is coupled to the collector of transistor 182 and is held in a deenergized state as long as transistor 182 is non-conductive. A shunt diode 187 is connected in parallel with holding coil 64 to prevent extraneous spike signals from being developed and damaging components.

To operate the entire receiver code operated switch 38 a power supply 72 is provided and includes a step down transformer 190 having a primary winding 191 connectable to any suitable source of alternating current voltage and a secondary winding 192 to which is coupled a bridge rectifier network 193. This bridge-rectifier network developes approximately 12 volts at its output terminal and delivers this 12 volts through the regulator network 73 which comprises a transistor 194 which, in turn, has the base electrode thereof coupled to ground potential through a Zener diode 196. To insure proper stability of the logic board 62 a 5 volt source, which can be developed by suitable voltage dropping resistor networks is applied to an input thereof and is regulated as a result of the parallel network comprising the Zener diode 197 and capacitor 198 together with a resistor 199.

To provide a telermetering indication that the receiver code operated switch 38 has been in fact, energized in response to the code signal delivered thereto, test means 200 provides an RF carrier signal coupled to one side of the relay contacts, here being illustrated as being connected to movable contact side 64b and this radio frequency signal is then received at the head end or central station when the test signal is coupled through an inductance element 116 and the associated relay switches. This is only one means of providing indication that the relay is in fact actuated.

While a single specific embodiment of the present invention has been herein illustrated it will be understood that variations and modifications may be effected without departing from the spirit and scope of the novel concepts disclosed and claimed herein.

The invention is claimed as follows:

1. In a communication system for sending and receiving data, the combination including: a plurality of data transmitting means each being represented bby a predetermined discrete interrogation code, code interrogation means for generating a discrete code signal corresponding to a selected one of the interrogation codes and representing a particular one of said data transmitting means, code operated switch means coupled to each of said data transmitting means, each code operated switch means including, input means for receiving first and second RF frequencies having predetermined difference and sum frequencies, a single filter circuit coupled to said input for passing said first and second RF frequencies and said control signal, at least one of said first and second RF frequencies being modulated with a control signal, detector means coupled to said single filter circuit for receiving said first and second RF frequencies and producing therefrom an intermediate frequency which includes said control signal, normally open circuit means coupled to said detector means and operative in response to said control signal, and data retrieval means coupled to said code operated switch means to receive data signals from the discrete data transmitting means which has been interrogated when said normally open circuit means is closed.

2. The communications system according to claim 1, further including means operable so that the absence of FSK modulation of said first and second RF frequencies represent a first logic state and the presence of said FSK modulation represents a second logic state, said code operated switch being interrogated in response to changes in said first and second logic states, said code operated switch further including logic detector means coupled between said detector means and said normally open circuit means for operating said normally open circuit means in response to a predetermined logic code.

3. The communications system according to claim 2, further including comparitor means coupled between said mixer means and said logic detector means, said comparitor means having an adjustable element to set a given threshold level to allow passage of control signals which only exceeds said threshold level, thereby eliminating extraneous signals from passing therethrough.

4. The communications system according to claim 1, wherein said normally open circuit means is a relay which is actuated in response to the presence of said control signal to allow data signals to pass from said data transmitting means to said data retrieval means through said code operated switch means in a direction oppstie that of the direction from which said first and second RF frequencies are received.

5. The communications system according to claim 4, further including signal generator means for applying a test signal to said relay to determine at a remote location that said relay is actuated in response to the control signal.

6. In a code operated switching apparatus, the combination including: input means for receiving first and second RF frequencies from a central station and having a predetermined frequency difference, at least one of said first and second RF frequencies being modulated with a predetermined control signal at the central station, detector means coupled to said input means for detecting an intermediate frequency which includes said control signal a single filter circuit coupled to said input means of said detector means for passing said first and second RF frequencies and said control signal, and switch means coupled to said detector means to be operated in response to said control signal.

7. The code operated switching apparatus as set forth in claim 8, wherein the absence of FSK modulation of said first and second RF frequencies represents a first logic state and the presence of FSK modulation represents a second logic state, the apparatus further including logic detector means coupled between said detector means and said switch means for operating said switch means in response to a predetermined logic code.

8. The code operated switching apparatus as set forth in claim 7, further including comparitor means coupled between said detector means and said logic detector means, said comparator means having an adjustable element to set a given threshold level to allow passage of said control signals which only exceed said threshold level, thereby eliminating extraneous signals from passing therethrough.

9. The code operated switching apparatus as set forth in claim 6, wherein said switch means is a relay which is actuated in response to the presence of said control signal to allow passage of data signals through the apparatus in a direction opposite that of the direction from which said first and second RF frequencies are received.

10. The apparatus as set forth in claim 9, further including signal generator means for applying a test signal to said relay to determine at a remote location that said relay is actuated in response to the control signal.

11. The apparatus as set forth in claim 6, further including a first highpass filter means coupled to said input means, first highpass filter means being coupled to an output terminal through a second highpass filter, RF amplifier means coupled to said first highpass filter means for receiving said first and second RF frequencies and amplifying the same said detector means including a transistor and a capacative output, inductive circuit coupled to the output of said detector means tuned to said intermediate frequency for developing said intermediate frequency and the control signals associated therewith, IF amplifier discriminator means to develop audio signal information in response to FSK modulation of said first and second RF frequencies, said IF amplifier discriminator means being coupled to said mixer means, the output of said IF amplifier discriminator being coupled to one input of an operational amplifier which functions as a comparator circuit, an adjustable voltage input coupled to a second input of said operational amplifier whereby a setting of predetermined minimum voltage value is maintained to pass only signal information above said minimum value thereby eliminating the possibility of extraneous signals from passing through said comparator, logic circuit means coupled to the output of said comparator for producing a control signal in response to receiving a proper code modulated into said first and second RF frequencies by FSK modulation, and test signal means coupled to said relay for indicating actuation at a remote location of said relay.

12. The code operated switching apparatus as set forth in claim 6, wherein said switching means is normally open in the absence of said control signal, and closes only in response to predetermined code information of said control signal.

13. The communication system according to claim 1 wherein said code and communication means includes circuit means for FSK modulation of said first and second RF frequencies.

14. The communication system as set forth in claim 1 wherein said code interrogation means includes means for FSK modulation of said first and second frequencies, said modulation means for decreasing the frequency of one of said first and second RF frequency to provide said control signal.

15. The code operated as switching apparatus as set forth in claim 8 wherein the central station includes means for FSK modulation, said first and second RF frequencies simultaneously to produce said control signal.

16. The code operated switching apparatus as set forth in claim 8 wherein said detector means selects the difference of frequency between said first and second RF frequencies to develop an intermediate frequency corresponding to said control signal.

* * * * *

UNITED STATES PATENT OFFICE
CERTIFICATE OF CORRECTION

Patent No. 3,936,747          Dated FEBRUARY 3, 1976

Inventor(s) DAVID S. MCVOY

It is certified that error appears in the above-identified patent and that said Letters Patent are hereby corrected as shown below:

Col. 7, line 33, after "VHF" insert --frequencies over the VHF--

Col. 8, line 57, after "detector" insert --stage--

Col. 11, line 67, "claim 8" should be --claim 6--

Signed and Sealed this eleventh Day of May 1976

[SEAL]

Attest:

RUTH C. MASON
Attesting Officer

C. MARSHALL DANN
Commissioner of Patents and Trademarks